US012680839B2

(12) United States Patent
Evans et al.

(10) Patent No.: US 12,680,839 B2
(45) Date of Patent: Jul. 14, 2026

(54) APPARATUS, DISC, AND METHOD OF MANUFACTURE

(71) Applicant: RENISHAW PLC, Wotton-under-Edge (GB)

(72) Inventors: Finlay Jonathan Evans, Malmesbury (GB); Duncan Searle, Charfield (GB)

(73) Assignee: RENISHAW PLC, Wotton-Under-Edge (GB)

( * ) Notice: Subject to any disclaimer, the term of this patent is extended or adjusted under 35 U.S.C. 154(b) by 0 days.

(21) Appl. No.: 18/027,195

(22) PCT Filed: Oct. 4, 2021

(86) PCT No.: PCT/GB2021/052557
§ 371 (c)(1),
(2) Date: Mar. 20, 2023

(87) PCT Pub. No.: WO2022/074368
PCT Pub. Date: Apr. 14, 2022

(65) Prior Publication Data
US 2024/0295417 A1 Sep. 5, 2024

(30) Foreign Application Priority Data

Oct. 5, 2020 (GB) ...................................... 2015773

(51) Int. Cl.
*G01D 5/347* (2006.01)
*G01D 5/244* (2006.01)

(52) U.S. Cl.
CPC ..... *G01D 5/24442* (2013.01); *G01D 5/34738* (2013.01)

(58) Field of Classification Search
CPC ......................... G01D 5/3473; G01D 5/34738
(Continued)

(56) References Cited

U.S. PATENT DOCUMENTS 1,183,190 A 5/1916 Hansell
2,855,228 A 10/1958 Peter et al.
(Continued)

FOREIGN PATENT DOCUMENTS

AU 2012100637 A4 8/2012
CN 102744731 A 10/2012
(Continued)

OTHER PUBLICATIONS

May 11, 2022 International Search Report issued in International Patent Application No. PCT/GB2022/050329.
(Continued)

*Primary Examiner* — George B Bennett
(74) *Attorney, Agent, or Firm* — Oliff PLC

(57) ABSTRACT
An apparatus including an encoder scale disc and a mount, the encoder scale disc including radially and/or tangentially resilient features located radially outwards of a scale configured to interact with the mount so as to locate the scale disc on the mount. The encoder scale disc may include radially resilient features which may deviate radially from the disc. A method of manufacturing an apparatus including an encoder scale disc, including mounting a disc including radially resilient features to a device, wherein the radially resilient features of the disc interact with the device to place the disc in radial compression, mounting the disc on an apparatus, wherein mounting features on the device and the apparatus interact in the same manner to place the disc in radial compression.

21 Claims, 8 Drawing Sheets

(58) Field of Classification Search
USPC .......................................................... 33/1 PT
See application file for complete search history.

(56) References Cited

U.S. PATENT DOCUMENTS

| | | | |
|---|---|---|---|
| 3,463,520 A | 8/1969 | Turro | |
| 3,708,243 A | 1/1973 | Wooden | |
| 3,740,085 A | 6/1973 | Evans | |
| 3,761,114 A | 9/1973 | Blakeley | |
| 3,774,675 A | 11/1973 | Yoshiro | |
| 3,871,668 A | 3/1975 | Coker et al. | |
| 4,183,688 A | 1/1980 | Persson | |
| 4,472,713 A | 9/1984 | Breslow | |
| 4,476,457 A | 10/1984 | Kondo | |
| 4,556,792 A | 12/1985 | Kano et al. | |
| 4,620,814 A | 11/1986 | May | |
| 4,718,879 A | 1/1988 | Wada | |
| 4,795,902 A * | 1/1989 | Kitaue | G01D 5/3473 |
| | | | 250/578.1 |
| 4,835,505 A | 5/1989 | Hattori et al. | |
| 4,862,044 A | 8/1989 | Karashima et al. | |
| 4,926,566 A | 5/1990 | McMurtry et al. | |
| 4,940,936 A | 7/1990 | Grillo et al. | |
| 4,942,295 A | 7/1990 | Brunner et al. | |
| 4,959,542 A | 9/1990 | Stephens | |
| 4,974,962 A | 12/1990 | Stephens et al. | |
| 5,174,680 A | 12/1992 | Nakamura et al. | |
| 5,176,085 A * | 1/1993 | Hara | D05B 69/24 |
| | | | 341/13 |
| 5,196,970 A * | 3/1993 | Seko | G11B 5/5556 |
| | | | 360/77.03 |
| 5,218,199 A | 6/1993 | Miller | |
| 5,227,930 A * | 7/1993 | Thanos | G11B 5/5534 |
| | | | 360/78.04 |
| 5,698,849 A | 12/1997 | Figueria, Jr. | |
| 5,758,427 A | 6/1998 | Feichtinger et al. | |
| 6,087,748 A | 7/2000 | Donner | |
| 6,094,047 A | 7/2000 | Guzik et al. | |
| 6,098,295 A | 8/2000 | Feichtinger | |
| 6,255,644 B1 | 7/2001 | Taniguchi et al. | |
| 6,293,021 B1 | 9/2001 | Freitag et al. | |
| 6,359,432 B1 | 3/2002 | Okumura | |
| 6,360,449 B1 * | 3/2002 | Steentjes | G01D 5/2457 |
| | | | 33/1 PT |
| 6,396,016 B1 | 5/2002 | Lin et al. | |
| 6,481,115 B1 | 11/2002 | Henshaw et al. | |
| 6,508,140 B2 | 1/2003 | Zaps | |
| 6,536,267 B2 | 3/2003 | Kieselbach | |
| 6,608,300 B2 | 8/2003 | Meschko | |
| 6,642,508 B2 | 11/2003 | Setbacken et al. | |
| 6,810,590 B2 * | 11/2004 | Sano | B62D 15/02 |
| | | | 33/1 PT |
| 6,885,188 B2 * | 4/2005 | Russell | E21B 47/022 |
| | | | 33/352 |
| 6,960,758 B2 | 11/2005 | Tenca et al. | |
| 6,966,118 B2 * | 11/2005 | Sano | G01D 5/2492 |
| | | | 341/3 |
| 7,034,282 B2 | 4/2006 | Oka et al. | |
| 7,281,851 B2 | 10/2007 | Horiuchi et al. | |
| 7,367,128 B2 | 5/2008 | McMurtry et al. | |
| 7,499,827 B2 | 3/2009 | Gordon-Ingram | |
| 7,601,948 B1 | 10/2009 | Setbacken et al. | |
| 7,659,992 B2 | 2/2010 | McMurtry et al. | |
| 7,669,346 B2 | 3/2010 | Madore | |
| 7,795,771 B2 | 9/2010 | Lott et al. | |
| 7,958,620 B2 | 6/2011 | Henshaw | |
| 8,077,426 B2 | 12/2011 | Guzik et al. | |
| 8,525,459 B2 * | 9/2013 | Setbacken | G01D 5/34792 |
| | | | 250/237 G |
| 8,829,421 B2 * | 9/2014 | Noguchi | G01D 5/34784 |
| | | | 356/616 |
| 9,091,569 B2 * | 7/2015 | Gottemoller | G01D 5/3473 |
| 9,103,381 B2 | 8/2015 | Arnstein | |
| 9,658,049 B2 | 5/2017 | Arnstein et al. | |

| | | | |
|---|---|---|---|
| 10,094,684 B2 | 10/2018 | Horiguchi et al. | |
| 10,132,657 B2 | 11/2018 | Gordon-Ingram et al. | |
| 10,240,952 B2 | 3/2019 | Fukuda et al. | |
| 10,989,569 B2 | 4/2021 | Thaler et al. | |
| 11,692,856 B1 * | 7/2023 | Siracki | F16C 41/007 |
| | | | 73/493 |
| 11,879,756 B2 * | 1/2024 | Lai | G01D 5/24461 |
| 2001/0006314 A1 | 7/2001 | Braun | |
| 2002/0089300 A1 | 7/2002 | Uchiyama et al. | |
| 2003/0042408 A1 | 3/2003 | Setbacken et al. | |
| 2003/0094568 A1 | 5/2003 | Meschko | |
| 2004/0118758 A1 | 6/2004 | Gordon-Ingram | |
| 2005/0047691 A1 | 3/2005 | Niebling et al. | |
| 2005/0069233 A1 | 3/2005 | Horiuchi et al. | |
| 2005/0087683 A1 | 4/2005 | Kawai et al. | |
| 2005/0229410 A1 | 10/2005 | McMurtry et al. | |
| 2006/0065414 A1 | 3/2006 | Brandl et al. | |
| 2007/0069594 A1 | 3/2007 | Braun | |
| 2008/0013105 A1 | 1/2008 | McMurtry et al. | |
| 2008/0189934 A1 | 8/2008 | Henshaw | |
| 2008/0240849 A1 | 10/2008 | Lindemann | |
| 2009/0095892 A1 | 4/2009 | Summers et al. | |
| 2009/0252549 A1 | 10/2009 | Takeuchi et al. | |
| 2009/0323203 A1 | 12/2009 | Adams et al. | |
| 2010/0038527 A1 | 2/2010 | Madore | |
| 2011/0271540 A1 | 11/2011 | Henshaw | |
| 2012/0076575 A1 | 3/2012 | Smith | |
| 2012/0206024 A1 | 8/2012 | Yoshida et al. | |
| 2013/0269198 A1 | 10/2013 | Sivec et al. | |
| 2013/0296062 A1 | 11/2013 | Arnstein | |
| 2016/0216137 A1 | 7/2016 | Horiguchi et al. | |
| 2018/0259369 A1 | 9/2018 | Fukuda et al. | |
| 2019/0017848 A1 | 1/2019 | Horiguchi et al. | |
| 2019/0250012 A1 | 8/2019 | Thaler et al. | |
| 2021/0182673 A1 | 6/2021 | Brugger et al. | |
| 2023/0003557 A1 | 1/2023 | Evans et al. | |
| 2023/0053557 A1 | 2/2023 | Lee et al. | |
| 2023/0126475 A1 | 4/2023 | Nakazawa et al. | |
| 2024/0085219 A1 | 3/2024 | Carruthers-Watt et al. | |
| 2024/0085220 A1 | 3/2024 | Henshaw et al. | |
| 2024/0295417 A1 | 9/2024 | Evans et al. | |

FOREIGN PATENT DOCUMENTS

| | | | |
|---|---|---|---|
| CN | 205212642 U | 5/2016 | |
| CN | 108375385 A | 8/2018 | |
| CN | 209524932 U | 10/2019 | |
| CN | 218035079 U | 12/2022 | |
| DE | 24 29 741 A1 | 1/1976 | |
| DE | 25 18 774 A1 | 11/1976 | |
| DE | 34 19 101 C1 | 7/1985 | |
| DE | 3740744 A1 | 6/1988 | |
| DE | 41 30 111 A1 | 3/1993 | |
| DE | 196 01 271 A1 | 7/1997 | |
| DE | 29622996 U1 | 10/1997 | |
| DE | 19742114 A1 | 3/1999 | |
| DE | 197 51 019 A1 | 6/1999 | |
| DE | 100 19 499 A1 | 10/2001 | |
| DE | 10 2008 046 540 A1 | 3/2010 | |
| DE | 10 2010 030 121 A1 | 2/2011 | |
| DE | 10 2011 015 886 A1 | 10/2012 | |
| EP | 0 204 345 A2 | 12/1986 | |
| EP | 0 207 121 A1 | 1/1987 | |
| EP | 0 213 732 A1 | 3/1987 | |
| EP | 0 293 487 A1 | 12/1988 | |
| EP | 0 520 853 A1 | 12/1992 | |
| EP | 0 927 873 A1 | 7/1999 | |
| EP | 1 094 302 A2 | 4/2001 | |
| EP | 1 526 363 A1 | 4/2005 | |
| EP | 2 028 449 A1 | 2/2009 | |
| EP | 2065684 A2 | 6/2009 | |
| EP | 2 660 567 A1 | 11/2013 | |
| EP | 2660610 A2 | 11/2013 | |
| EP | 3048427 A1 | 7/2016 | |
| FR | 3060897 A1 | 6/2018 | |
| GB | 1 511 801 A | 5/1978 | |
| GB | 2 358 063 A | 7/2001 | |
| GB | 2 388 431 A | 11/2003 | |
| JP | S59-142420 A | 8/1984 | |

(56) References Cited

FOREIGN PATENT DOCUMENTS

| | | | |
|---|---|---|---|
| JP | S60-16017 | U | 2/1985 |
| JP | S63-176869 | A | 7/1988 |
| JP | S64-3330 | A | 1/1989 |
| JP | H02-16412 | A | 1/1990 |
| JP | H04-82271 | A | 3/1992 |
| JP | H05-272990 | A | 10/1993 |
| JP | H05-296789 | A | 11/1993 |
| JP | H06-40812 | U | 5/1994 |
| JP | H06-347290 | A | 12/1994 |
| JP | H09-115261 | A | 5/1997 |
| JP | H11-2256 | A | 1/1999 |
| JP | H11-14404 | A | 1/1999 |
| JP | H11-83542 | A | 3/1999 |
| JP | 2004-340929 | A | 12/2004 |
| JP | 2008-064543 | A | 3/2008 |
| JP | 2016-138759 | A | 8/2016 |
| JP | 2017-177245 | A | 10/2017 |
| JP | 2018-151178 | A | 9/2018 |
| RU | 2 212 099 | C1 | 9/2003 |
| TW | 200600753 | A | 1/2006 |
| TW | I269021 | B | 12/2006 |
| WO | 2004/008076 | A1 | 1/2004 |
| WO | 2006/114602 | A1 | 11/2006 |
| WO | 2010/072498 | A1 | 7/2010 |
| WO | 2021/116660 | A1 | 6/2021 |
| WO | 2022/074368 | A1 | 4/2022 |
| WO | 2022/074371 | A1 | 4/2022 |
| WO | 2022/171994 | A1 | 8/2022 |
| WO | 2022/171995 | A1 | 8/2022 |

OTHER PUBLICATIONS

May 11, 2022 Written Opinion issued in International Patent Application No. PCT/GB2022/050329.
May 9, 2022 International Search Report issued in International Patent Application No. PCT/GB2022/050328.
May 9, 2022 Written Opinion issued in International Patent Application No. PCT/GB2022/050328.
Wikipedia Page, "Indicator (distance amplifying instrument)", Accessed Dec. 21, 2023.
U.S. Appl. No. 18/272,847, filed Jul. 18, 2023 in the name of Henshaw et al.
U.S. Appl. No. 18/273,058, filed Jul. 19, 2023 in the name of Carruthers-Watt et al.
Feb. 12, 2021 Search Report issued in International Patent Application No. PCT/GB2020/053084.
May 29, 2020 Search Report issued in British Patent Application No. GB1918002.5.
"E4P Assembly Instructions"; US Digital; www.usdigital.com; pp. 1-2.
Feb. 12, 2021 Written Opinion of the International Searching Authority issued in International Patent Application No. PCT/GB2020/053084.
Sep. 12, 2022 Search Report issued in European Patent Application No. 22275041.6.
Jun. 28, 2023 Search Report issued in International Patent Application No. PCT/GB2023/050829.
Jun. 28, 2023 Written Opinion of the International Searching Authority issued in International Patent Application No. PCT/GB2023/050829.
U.S. Appl. No. 18/848,166, filed Sep. 18, 2024 in the name of Carruthers-Watt et al.
U.S. Appl. No. 18/027,407, filed Mar. 21, 2023 in the name of Henshaw et al.
Mar. 19, 2021 Search Report Issued in British Patent Application No. 2015773.1.
Dec. 13, 2021 Search Report Issued in International Patent Application No. PCT/GB2021/052557.
Dec. 13, 2021 Written Opinion of the International Searching Authority Issued in International Patent Application No. PCT/GB2021/052557.
Jul. 12, 2021 extended Search Report Issued in European Patent Application No. EP 21 27 5014.5.
Dec. 23, 2021 Search Report Issued in International Patent Application No. PCT/GB2021/052562.
Dec. 23, 2021 Written Opinion of the International Searching Authority Issued in International Patent Application No. PCT/GB2021/052562.
Feb. 16, 2024 Office Action issued in U.S. Appl. No. 18/272,847.
May 8, 2025 Office Action issued in U.S. Appl. No. 18/027,407.
Apr. 20, 2026 Noitce of Allowance issued in U.S. Appl. No. 18/273,058.

* cited by examiner

APPARATUS, DISC, AND METHOD OF MANUFACTURE

The present invention relates to an encoder apparatus and method of manufacture, in particular an encoder apparatus comprising a scale disc.

Encoders are typically used to measure the relative displacement between relatively moveable parts of a machine. For instance, encoders are used in many industries to provide position (or its derivatives, e.g. velocity and/or acceleration) feedback to a control system of a machine, e.g. feedback control for the position/motion of one part of a machine relative to another part of the machine. Typically, an encoder comprises a scale having a series of position features provided on one part of the machine and a readhead for reading the scale provided on the other part of the machine. Types of metrological scale include magnetic scales (in which the scale features are provided by features having particular magnetic properties), capacitive scales (in which the features are provided by features having particular capacitive properties), inductive scales (in which the features are provided by features having particular inductive properties) and optical scales (in which the features are provided by features having particular optical properties). Optical scales can be transmissive or reflective. Relative displacement of the first and second parts of the machine cause relative movement of the encoder scale and readhead allowing the extent of displacement to be determined. In other words, the relative position of scale and readhead, and hence the relative position of the machine parts, can be detected by the readhead along the encoder's measurement dimension.

Encoders can be linear encoders for measuring linear displacement or encoders may be rotary encoders for measuring rotary displacement. For rotary encoders a scale may be provided on a member which rotates in use with the shaft or other rotary part relative to the readhead. In particular, the member which has the scale and which may rotate in use with the shaft can be a disc or a ring.

An example of an encoder disc scale 1 is shown in FIG. 1(*a*). The encoder scale disc 1 has a first face 2 and a second face 4. A peripheral surface 7 is located between the first face 2 and the second face 4 on an outer edge of the disc. For an encoder disc scale the scale 8 may located on a face 2, 4 of the disc. JPH05296789 discloses an example of an encoder disc scale having a slit plate 21 where the scale extends through the disc from a first face to a second face, this is an example of a transmissive optical encoder disc. U.S. Pat. No. 5,758,427 discloses an example of a rotary encoder showing a scanning unit 41 positioned for reading a face of a scale disc 40. U.S. Pat. No. 6,255,644 discloses a code plate 6 comprising a disc DS having an attachment portion DM extending from one face of the disc DS. Attachment to a shaft member 20 is via attachment portion DM remote from the disc DS. FIG. 1(*b*) shows an example of an encoder ring scale 10. For an encoder ring scale, the scale 12 is located on a peripheral surface 14 located between two faces 16, 18.

According to a first aspect of invention there is provided an apparatus comprising an encoder scale disc and a mount. The encoder scale disc may comprise radially resilient features. The encoder scale disc may comprise tangentially resilient features. The encoder scale disc may comprise radially resilient features and tangentially resilient features. The radially and/or tangentially resilient features may be located radially outwards of a scale. The radially and/or tangentially resilient features may be configured to interact with the mount so as to locate the scale disc on the mount.

By locating the radially and/or tangentially resilient features radially outward of a scale can allow the encoder scale disc to be mounted via the periphery of the disc. This can allow for an increased area radially inward of the scale. An increased area radially inward of the scale can allow for a reduction of size of the encoder because more components (e.g. electronic components or through hole services which may include wires, cables, hoses, tubes etc. passing through the hole) can be located radially inward of the scale. Locating the radially and/or tangentially resilient features radially outward of a scale can allow the encoder scale disc to be mounted within a hollow shaft, in such embodiments increased room for through hole services or electronic components to be located within the scale may be advantageous. This can allow the encoder scale disc to be mounted without the need for external fastenings.

The encoder may be a rotary encoder. The encoder may be a rotary disc encoder. The encoder may comprise a single readhead. The encoder may comprise more than one readhead, for example the encoder may comprise two readheads. A rotary encoder with two readheads may mitigate or eliminate at least some errors which may arise from lack of concentricity of a scale with respect to a shaft.

The radially resilient features may be radially compliant. The radially resilient features may comprise flexures. The encoder scale disc may comprise a substantially annular disc (e.g. a flat substantially circular disc or annulus). The radially resilient features may deviate radially from the disc. The features may deviate radially outwards from the disc. The radially resilient features may deviate radially inward from the disc.

Radial deviation of the radially resilient features from disc can aid in mounting the disc and may help allow repeatable mounting (i.e. the or an encoder scale disc can be mounted in the same position relative to a part in substantially the same orientation each time) by providing a surface to be abutted by a mounting feature which may be present on a part to which the encoder scale disc is to be mounted. Abutment by a mounting feature can allow forces to be applied to the encoder scale disc to retain the encoder scale disc in position. Additional retention may be provided, for example adhesive.

The radially resilient features may comprise areas or regions of a peripheral surface of the disc of reduced radial stiffness. The radially resilient features may comprise areas or regions of a peripheral surface of the disc of increased radial compliance. The radially resilient features may comprise areas or regions of a peripheral surface of the disc of increased radial stiffness. The radially resilient features may comprise areas or regions of a peripheral surface of the disc of reduced radial compliance.

Differences is radial stiffness or radial compliance can allow forces to be applied to the encoder scale disc to retain the encoder scale disc in position. This may be achieved by applying a compressive load to the encoder scale disc. This may be achieved by applying a force or forces having a radially inward component to the encoder scale disc.

The encoder scale disc may comprise a metal encoder scale disc. The encoder scale disc may comprise a metal alloy. For example, the encoder scale disc may comprise one or more of steel, aluminium, or another metal or metal alloy. The encoder scale disc may comprise plastics. The encoder scale disc may comprise glass. The encoder scale disc may comprise ceramics.

According to a second aspect of invention there is provided an encoder apparatus comprising an encoder scale disc and a mount. When mounted on the mount, features of a peripheral surface of the encoder scale disc may interact with the mount to place the encoder scale disc in radial compression, which may retain the encoder scale disc on the mount.

Retaining the encoder scale disc via radial compression through interaction with a mount can allow the encoder scale disc to be mounted via the periphery of the disc. This can allow for an increased area radially inward of the scale. An increased area radially inward of the scale can allow for a reduction of size of the encoder because more components (e.g. electronic components or through hole services) can be located radially inward of the scale. Mounting the encoder scale disc via the periphery of the disc can also allow for an increased internal diameter of the disc (for example when the disc is an annulus), and can allow for a smaller encoder scale disc mass for the same diameter of disc. This can allow the encoder scale disc to be mounted without the need for external fastenings.

When mounted on the mount, the features of the peripheral surface of the encoder scale disc may deform part of the mount. Additionally or alternatively, when mounted on the mount, the features of the peripheral surface of the encoder scale disc are deformed by part of the mount. The deformation may comprise elastic deformation. This can allow the disc to be mounted repeatably (i.e. the or an encoder scale disc can be mounted in the same position relative to a part in substantially the same orientation each time), including for example on a device for forming scale on the disc prior to mounting to the mount. Repeatable mounting can allow a relationship between position of the encoder scale disc when mounted on the device for forming scale and the position of the encoder scale disc when mounted on the mount to be known.

According to a third aspect of invention there is provided a method of manufacturing an apparatus comprising an encoder scale disc, comprising in any suitable order, mounting a disc comprising radially resilient features to a device for applying scale, wherein the radially resilient features of the disc interact with the device for applying scale to place the disc in radial compression, applying a scale to the disc, removing the disc from the device for applying scale, mounting the disc on an apparatus, wherein mounting features on the device for applying scale and the apparatus interact in the same manner to place the disc in radial compression.

Optionally the method includes applying scale to the disc at a location radially inward of the radially resilient features. Optionally when mounted on a mount of the device for applying scale or on a mount of the apparatus the radially resilient features of the disc deform part of the or each mount.

Optionally when mounted on a mount of the device for applying scale or on a mount of the apparatus the radially resilient features of the disc are deformed by part of the or each mount. Optionally the device for applying scale and the apparatus comprise geometrically common features for interacting with the radially resilient features of the disc.

Optionally the disc is moved relative to the mount of the device for applying scale or the mount of the apparatus between a first position and a second position and wherein in the second position interaction between the mount and the radially resilient features applies a radially inward force to the disc.

The radially inward force applied to the disc in the second position may be greater than a radially inward force to the disc by the mount of the device for applying scale or the mount of the apparatus in the first position. In the first position there may be clearance between the mount of the device for applying scale or the mount of the apparatus and the radially resilient features.

Optionally the encoder disc is rotated relative to the mount of the device for applying scale or the mount of the apparatus between the first position and the second position.

According to a fourth aspect of invention there is provided an encoder apparatus comprising an encoder scale disc, and a mount, wherein when mounted on the mount the encoder scale disc is placed in radial compression. This can allow the encoder scale disc to be mounted without the need for external fastenings. This can reduce the complexity of a manufacturing process. This can allow for an increased area radially inward of the scale. An increased area radially inward of the scale can allow for a reduction of size of the encoder because more components (e.g. electronic components or through hole services) can be located radially inward of the scale. Mounting the encoder scale disc via radial compression of the encoder scale disc can also allow for an increased internal diameter of the disc (for example when the disc is an annulus), and can allow for a smaller encoder scale disc mass for the same diameter of disc. This can allow the encoder scale disc to be mounted without the need for external fastenings.

According to a fifth aspect of invention there is provided an encoder scale disc of any one of the first, second, and/or third aspects.

According to a sixth aspect of invention there is provided a measurement apparatus comprising the encoder apparatus of any one of the first, second, and/or third aspects, and/or the encoder scale disc of the fourth aspect.

Optionally the measurement apparatus comprises an articulated head (for example as part of a scanning probe or touch trigger probe). The articulated head may be part of a touch probe. The articulated head may be part of an imaging probe. The articulated head may be part of an inductive probe. The articulated head may be part of a capacitive probe. The articulated head may have 5 or more degrees of freedom. The articulated head may have up to 5 degrees of freedom.

According to a seventh aspect of invention there is provided a method of manufacturing an encoder apparatus according to any one of the first, second, and/or third aspects, and/or the encoder scale disc of the fourth aspect comprising in any suitable order, mounting a disc comprising radially resilient features to a device for applying scale, wherein the radially resilient features of the disc interact with the device for applying scale to place the disc in radial. Optionally the disc is annular.

Using the radially resilient features of the encoder scale disc to interact with the device for applying scale can allow the relationship between the position in which the encoder scale disc is mounted on the device for applying scale and the position in which the encoder scale disc is mounted on the mount of the encoder to be known. Knowing the relative positions of the encoder scale disc on both the device for applying scale and the mount of an encoder can allow the position of the scale on the encoder to be known. This can be achieved for example by having similar or substantially identical features on the device for applying scale and the mount of the encoder. It will be understood that the features on the device for applying scale and the mount of the encoder do not need to be identical or similar as long as the encoder scale disc can be repeatably (i.e. the or an encoder scale disc can be mounted in the same position relative to a part in substantially the same orientation each time) mounted on each of the device for applying scale and mount of the encoder because a relationship between the positions of the encoder scale disc on each device can be known or measured.

Optionally the method comprises applying scale to the disc at a location radially inward of the radially resilient features. The method of manufacturing an encoder apparatus may comprise mounting the disc to the mount wherein the radially resilient features of the disc interact with the mount to place the disc in radial compression. Optionally during the method of manufacturing an encoder apparatus the radially resilient features of the disc deform part of the mount when mounted on the mount. Optionally when mounted on the mount the radially resilient features of the disc are deformed by part of the mount.

Optionally the device for applying scale and the mount of the encoder comprise geometrically common features for interacting with the radially resilient features of the disc. Providing geometrically common features for interacting with the radially resilient features of the disc for the device for applying scale and the mount of the encoder can allow the relationship between the position in which the encoder scale disc is mounted on the device for applying scale and the position in which the encoder scale disc is mounted on the mount of the encoder to be known. The geometrically common features can allow the encoder scale disc to be positioned in the same position relative to the geometrically common features of the radially resilient features of the disc for the device for applying scale and the mount of the encoder. Optionally the device for applying scale and the mount of the encoder comprise geometrically identical features for interacting with the radially resilient features of the disc.

Optionally the disc is movable relative to the mount of the encoder or of the device for applying scale between a first position and a second position and wherein in the second position interaction between the mount of the encoder or of the device for applying scale and the radially resilient features applies a radially inward force to the disc. Optionally the radially inward force applied to the disc in the second position is greater than a radially inward force to the disc by the mount of the encoder or of the device for applying scale in the first position. Optionally the encoder scale disc can be rotated between the first position and the second position. This can allow the disc to be held in the second position. Optionally the encoder scale disc is freely removable from the device for applying scale when in the first position.

According to an eighth aspect of invention there is provided a method of manufacturing an encoder apparatus according to any one of the first, second, and/or third aspects wherein the encoder disc scale is movable relative to the mount between a first position and a second position and wherein in the second position interaction between the mount and the radially resilient features applies a radially inward force to the disc. Optionally, the radially inward force applied to the encoder disc scale in the second position is greater than a radially inward force to the encoder disc scale by the mount in the first position. Optionally, in the first position there is clearance between the mount and the radially resilient features. Optionally, the encoder disc is rotatable relative to the mount between the first position and the second position.

Advantageously, moving the encoder disc scale between a first position and a second position can allow the encoder scale disc to be moved between a retained (or in use) position and another position which may be an insertion position. This can simplify the manufacturing process by allowing insertion of an encoder scale disc into a first position in a mount before the encoder scale disc is moved to a second position where the encoder scale disc is retained on the mount. The mounting may be repeatable (i.e. the or an encoder scale disc can be mounted in the same position relative to a part in substantially the same orientation each time) so that an encoder scale on an encoder scale disc is located in the same position relative to a mount.

Embodiments will now be illustrated, by way of example only, and with reference to the following drawings in which:

FIG. 1(*b*) shows an example of an encoder ring scale;

FIG. 5 is an isometric view of the encoder of FIG. 4;

FIG. 6 is a further view of the encoder of FIG. 4;

Figures 7, 8:
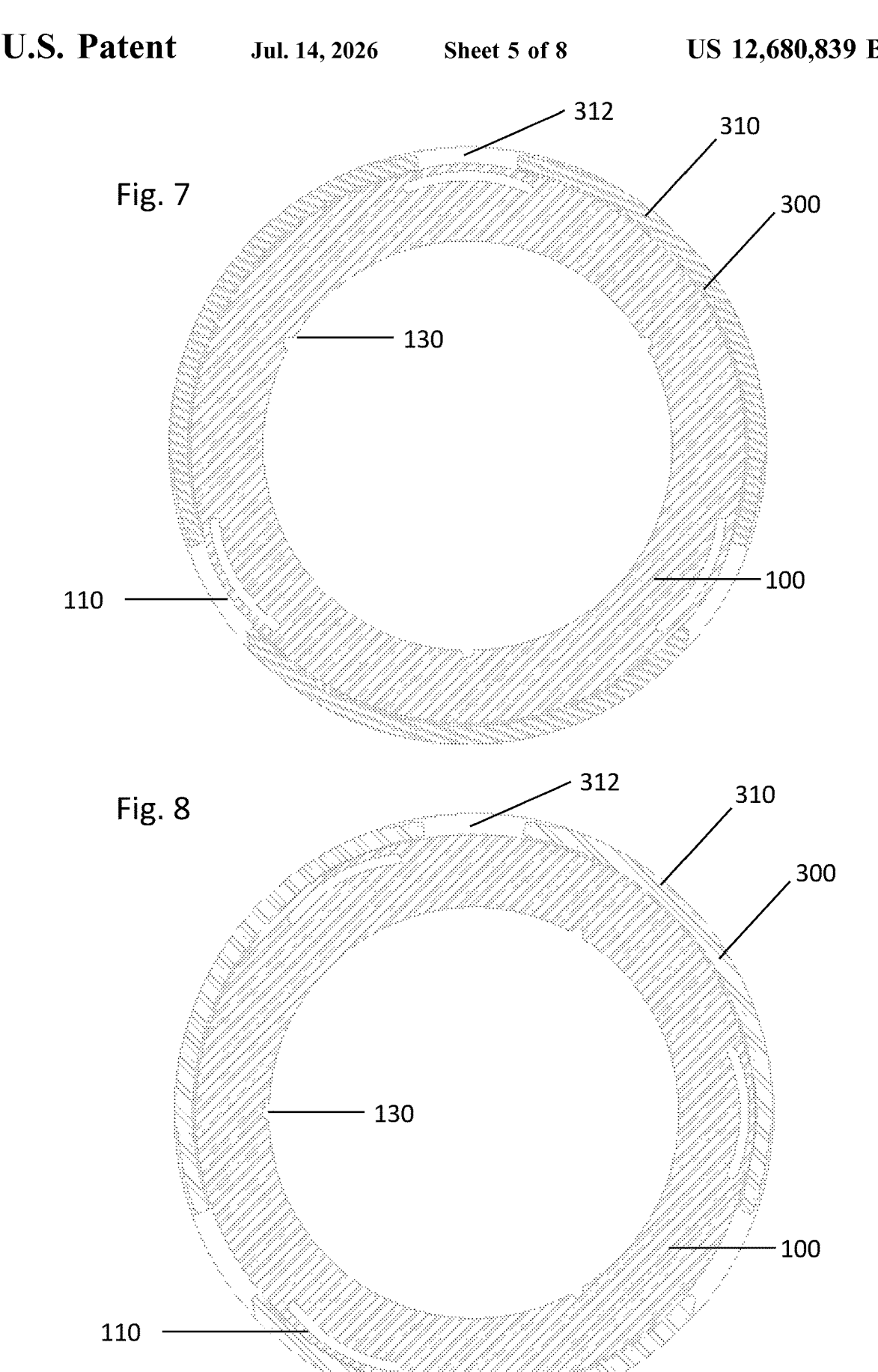
FIG. 7 shows an encoder scale disc in a first position relative to a mount.
Figure 9:
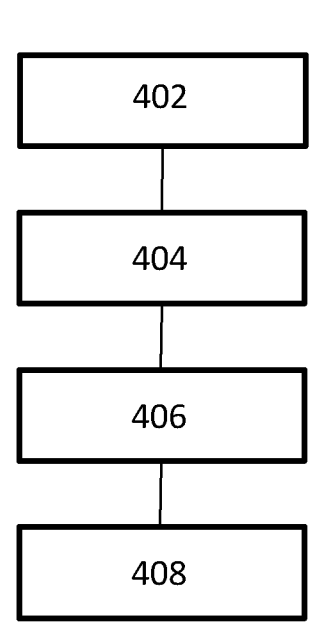
Figure 10:
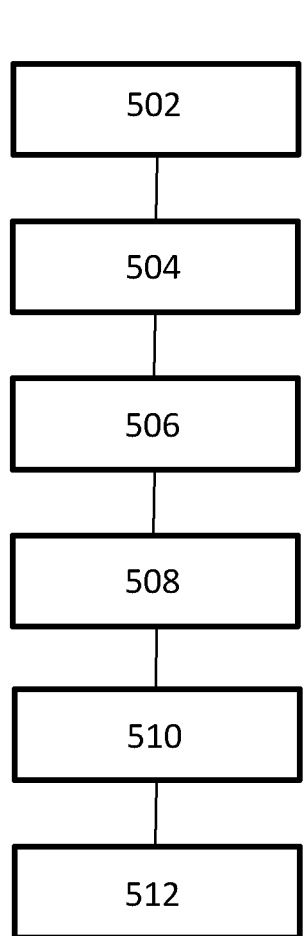
Figure 10:
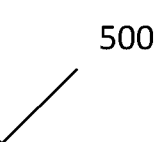
Figure 11:
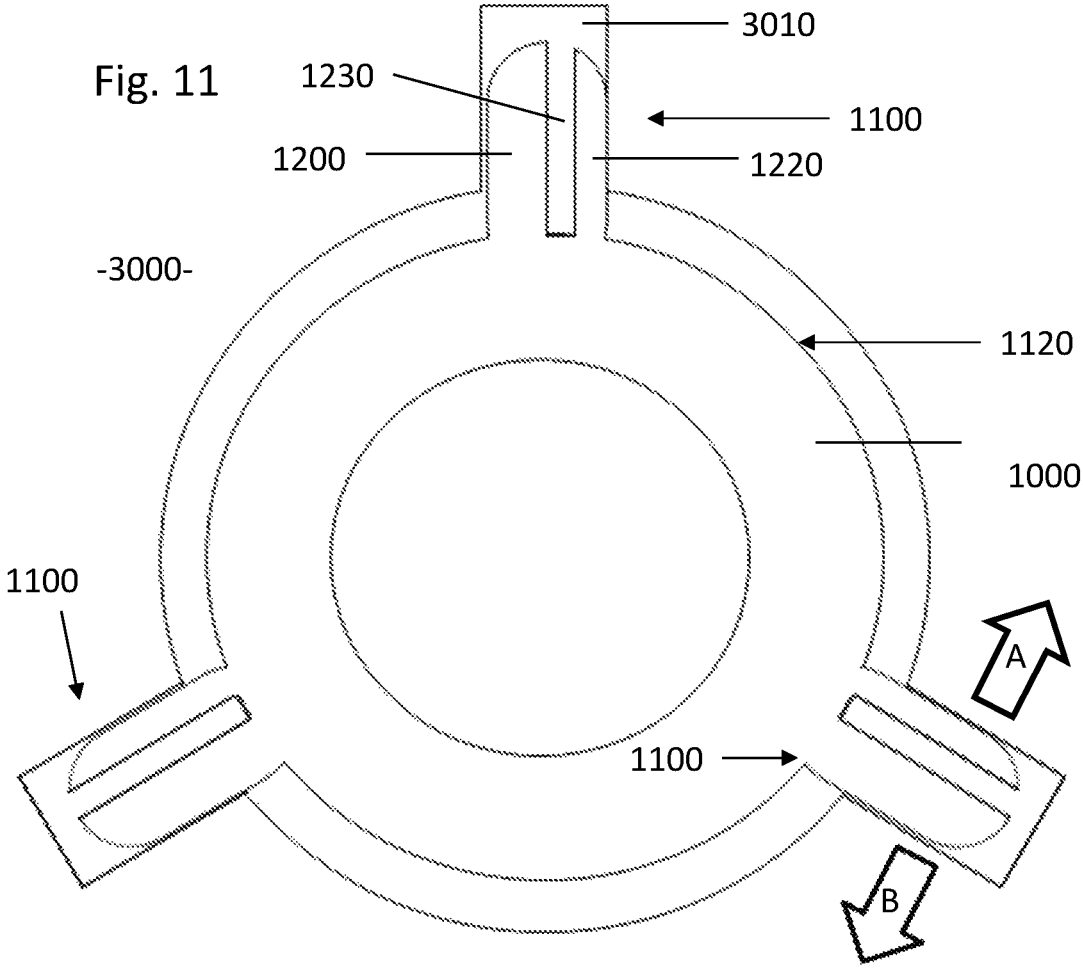
Figure 12:
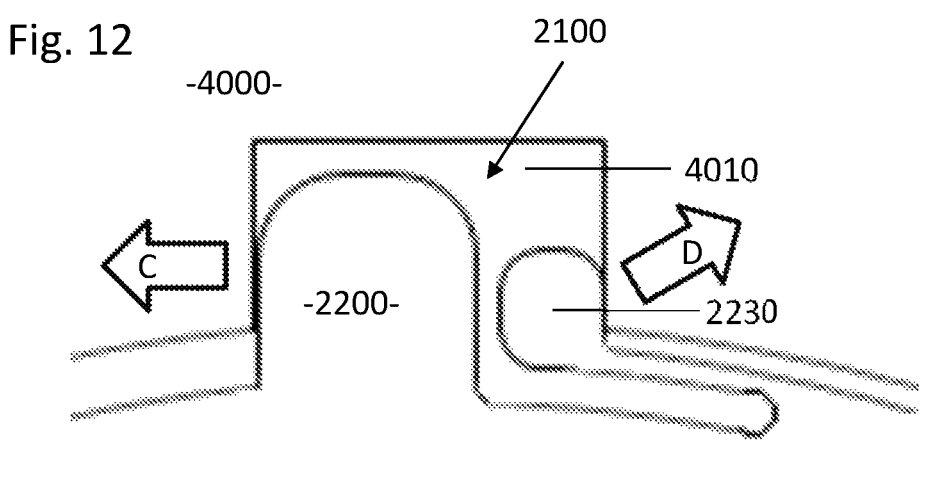
Figure 13:
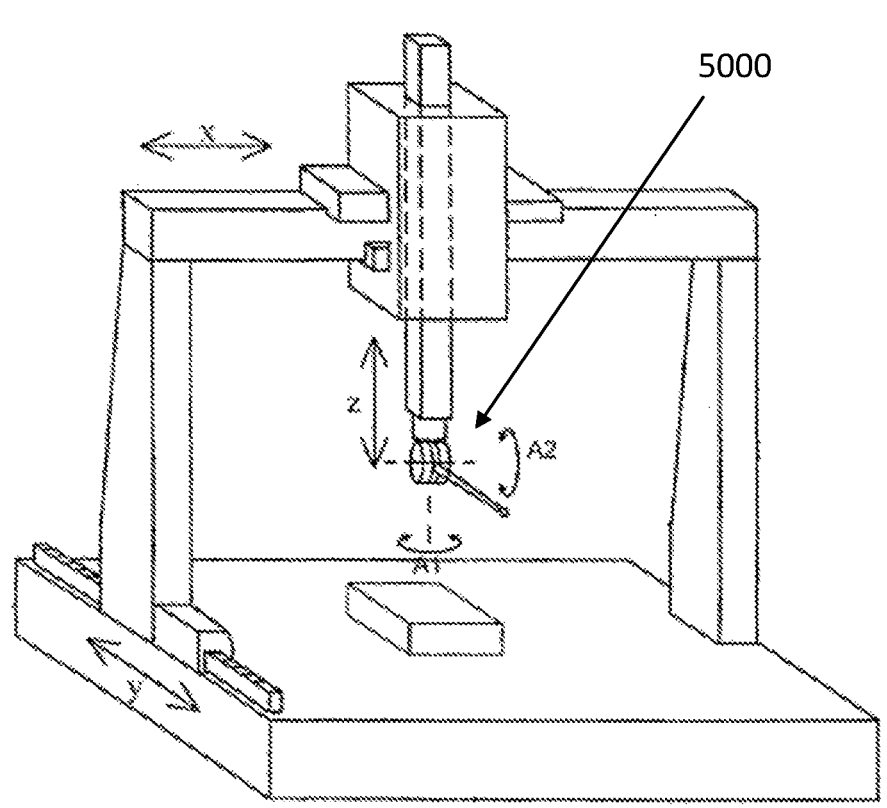

FIG. 8 shown an encoder scale disc in a second position relative to a mount;

FIG. 9 shows an encoder assembly method;

FIG. 10 shows an encoder scale disc manufacturing method;

FIG. 11 shows a second embodiment of an encoder scale disc according to the invention;

FIG. 12 shows a third embodiment of an encoder scale disc according to the invention;

FIG. 13 shows an embodiment of an articulated head.

Figure 1A:
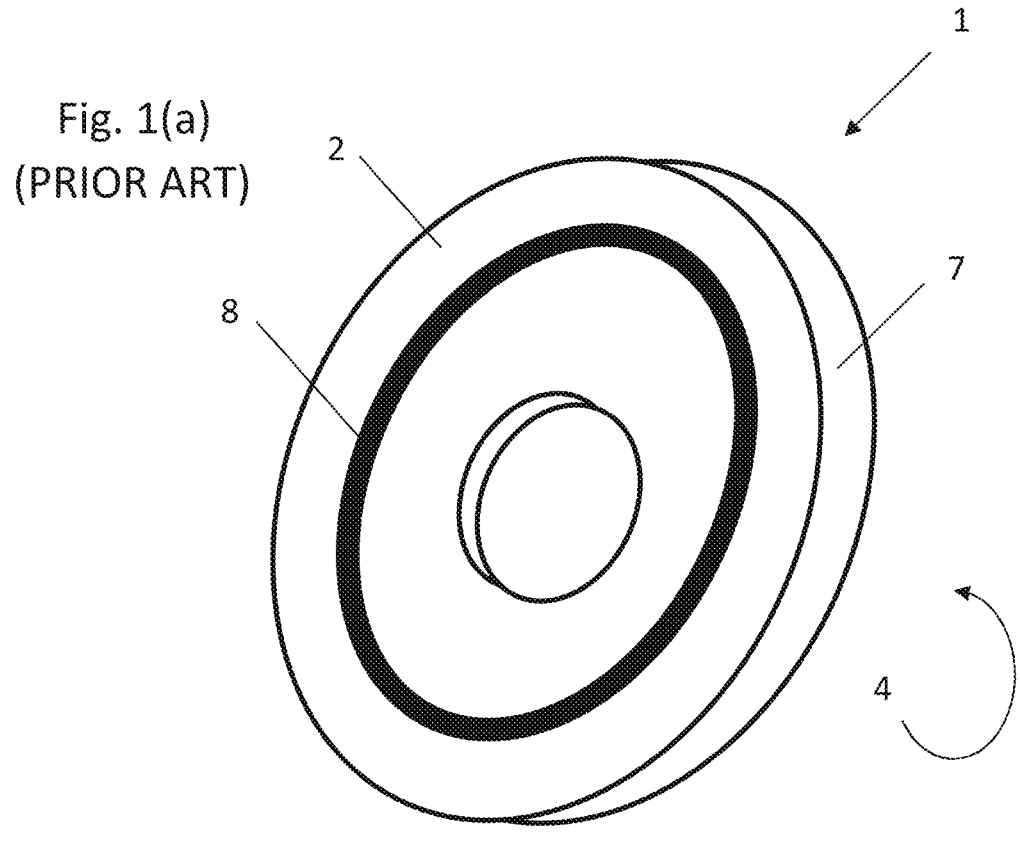
FIG. 1(*a*) shows an example of an encoder scale disc.
Figure 1B:
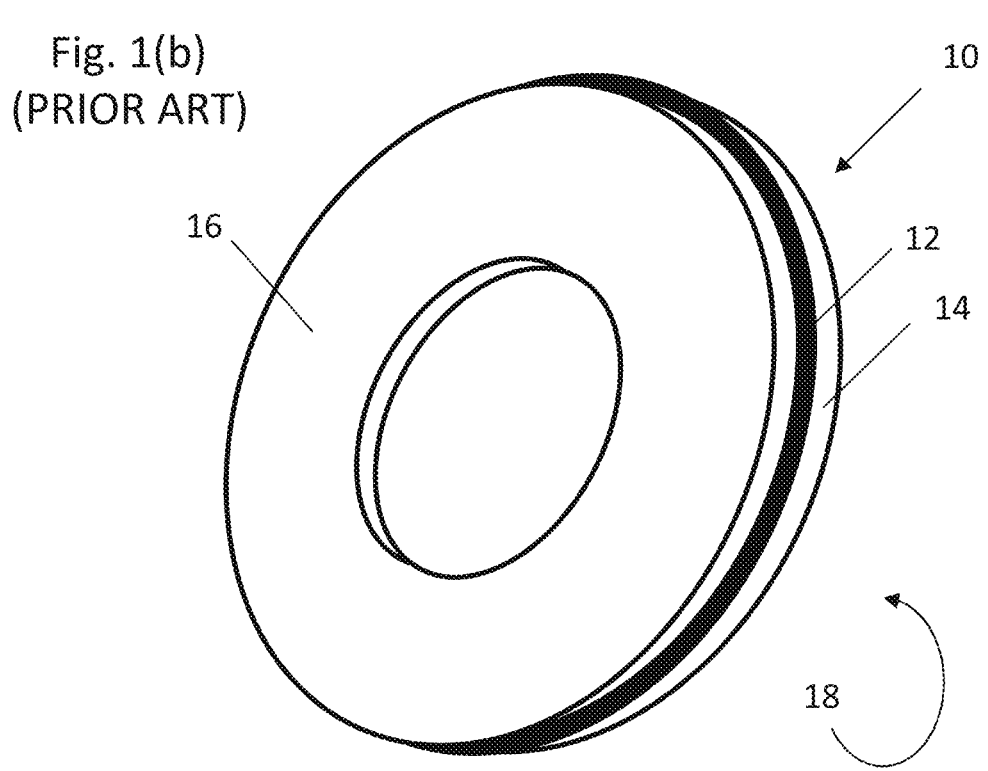
Figure 2:
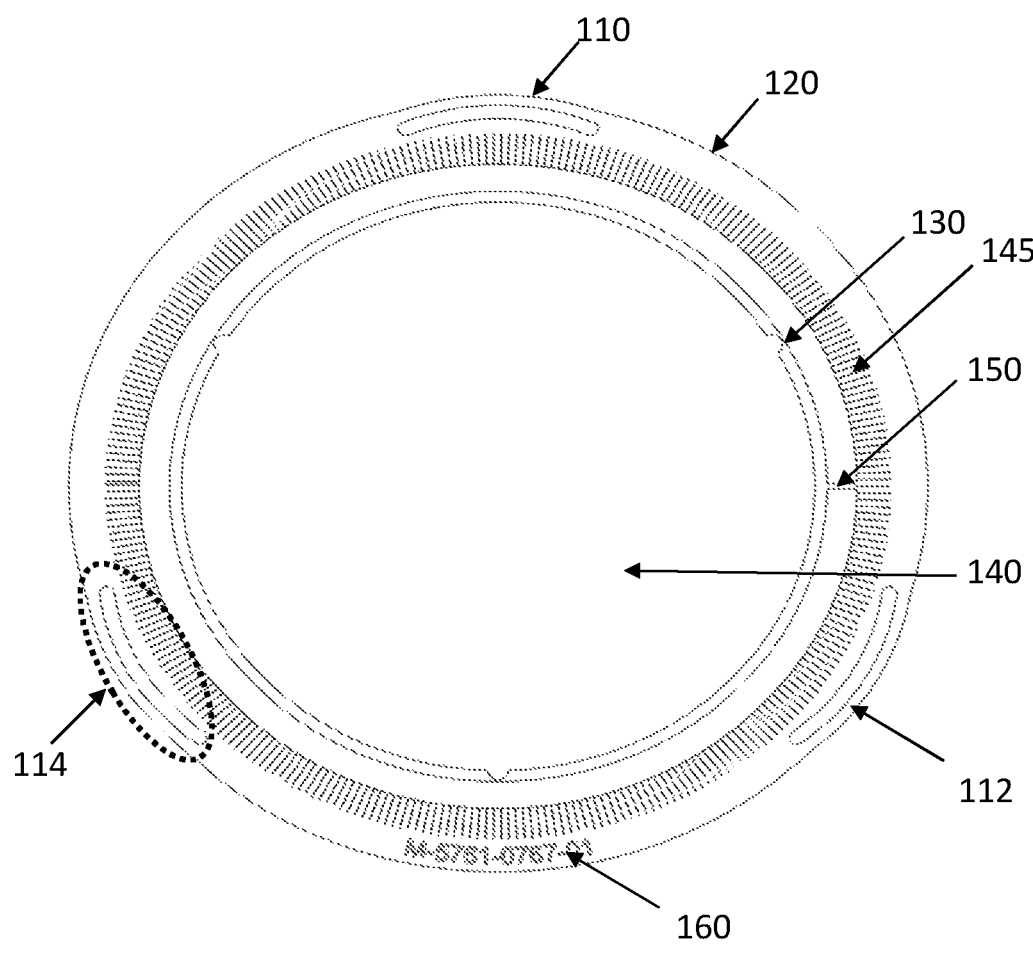
FIG. 2 shows an embodiment of an encoder scale disc according to the invention.

FIG. 2 shows an embodiment of an encoder scale disc 100. In this embodiment the encoder scale disc 100 comprises three radially resilient features 110. In this embodiment features 110 are in the form of flexures 110. Each of the flexures 110 comprises an aperture 112 and a protrusion 114. The protrusions 114 deviate radially outward from the generally circular shape of the encoder scale disc 100 of this embodiment. The encoder scale disc 100 has a generally planar annular shape (as can be seen in FIGS. 3 and 4).

The encoder disc scale 100 of the embodiment of FIG. 2 comprises a peripheral edge 120, and three assembly features 130 located around an inner space 140. The assembly features 130 can be used to hold and position the encoder scale disc in an encoder or in a device for device for applying scale. The inner space 140 can allow space for an axle and/or for through hole services when the encoder scale disc 100 is in use. The encoder scale disc 100 as shown in FIG. 2 comprises a scale which comprises a reference mark 150 located on a first face 160, also located on the first face 160 is an incremental scale 145. The encoder scale disc 100 of FIG. 2 is an optical incremental scale disc. Other markings may be present on the first face 160, for example the embodiment shown in FIG. 2 shows an identification marking on the first face 160 of the encoder scale disc 100.

Figures 3, 4:
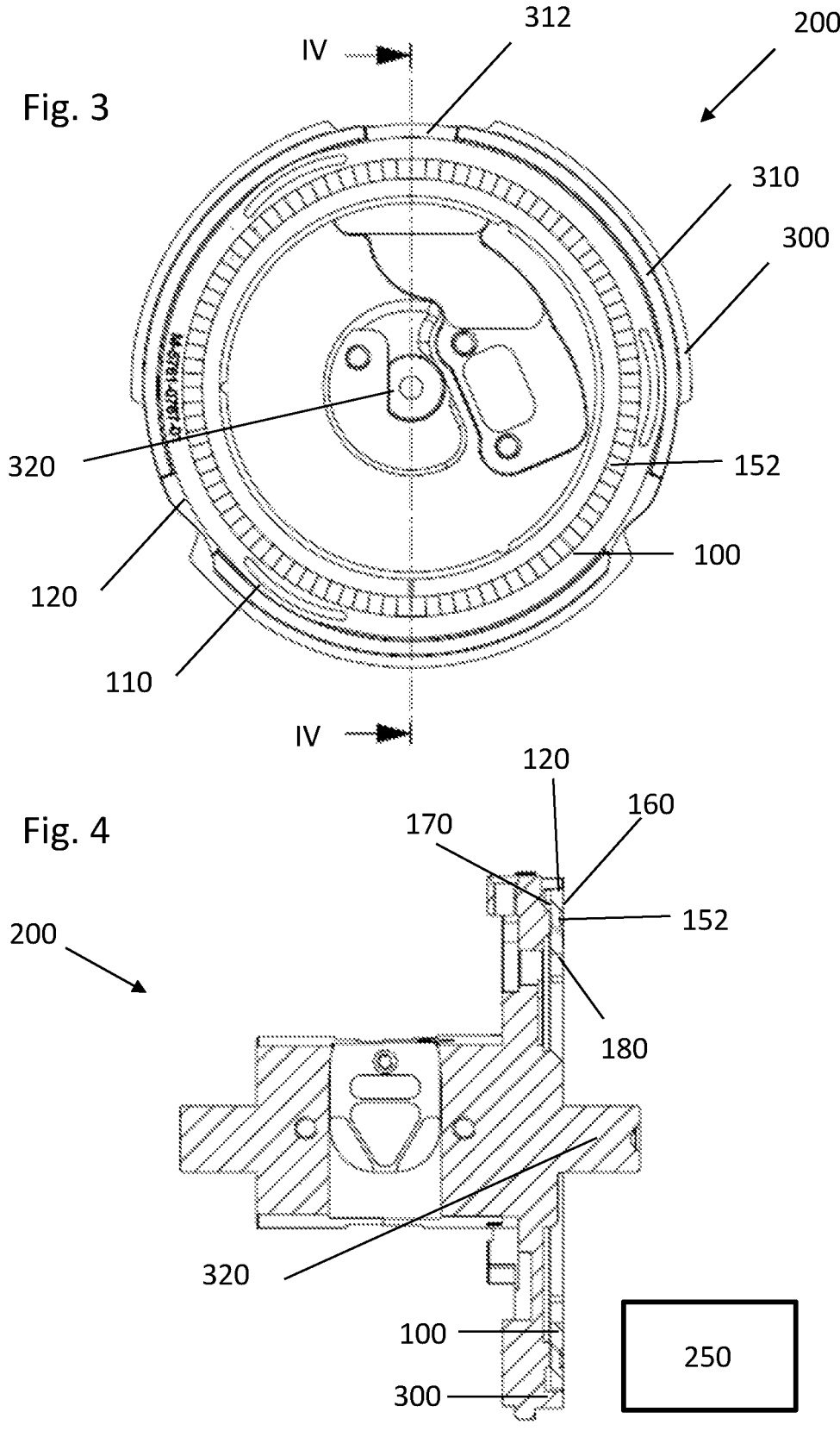
FIG. 3 shows an embodiment of an encoder according to the invention.
FIG. 4 shows a cross-sectional view of the encoder of FIG. 4 along the line IV-IV.

FIG. 3 shows an embodiment of an encoder 200. The encoder 200 comprises an encoder scale disc 100 and a mount 300. The encoder further comprises a readhead 250 (shown in FIG. 4). The mount 300 comprises a surround 310. In this embodiment the surround 310 comprises three mount gaps 312. The encoder 200 also comprises an axle 320. As can be seen in FIG. 3, the peripheral edge 120 in the region of the radially resilient features 110 of the encoder scale disc interacts with the surround 310 of the mount 300 in order to retain the encoder scale disc on the mount. In the region of the radially resilient features 110 the encoder scale disc 100 presses against the surround 310 of the mount 300. This causes a radially inward force to be applied to the radially resilient features 110.

The radially resilient features 110 are placed in compression. The encoder scale disc 100 comprises a scale 152.

FIG. 4 shows the encoder 200 of FIG. 3 in cross-section along the line IV-IV of FIG. 3. As can be seen in FIG. 4, the encoder scale disc 100 has a first face 160 (comprising a scale 152), a second face 170, and a peripheral edge 120 extending between the first face 160 and the second face 170 on an outer perimeter of the encoder scale disc 100. It can be seen that in the embodiment shown in FIG. 3 and FIG. 4 that the encoder scale disc 100 comprises a radial inner edge 180 which extends between the first face 160 and the second face 170. In this embodiment the radial inner edge 180 is spaced apart from the axle 320. The encoder scale disc 100 is mounted to the mount 300 via the peripheral edge 120. The encoder scale disc 100 of this embodiment is not directly mounted to the axle 320 via the radial inner edge 180.

A readhead 250 is provided to read the scale 152. In the illustrated embodiment, in use the encoder scale disc 100 is rotated relative to about the axle 320. This causes relative movement of the encoder scale disc 100 and readhead 250. The readhead 250 monitors the scale 152 and reference mark of the current embodiment which allows the amount of relative movement and/or speed of relative movement to be monitored.

Figures 5, 6:
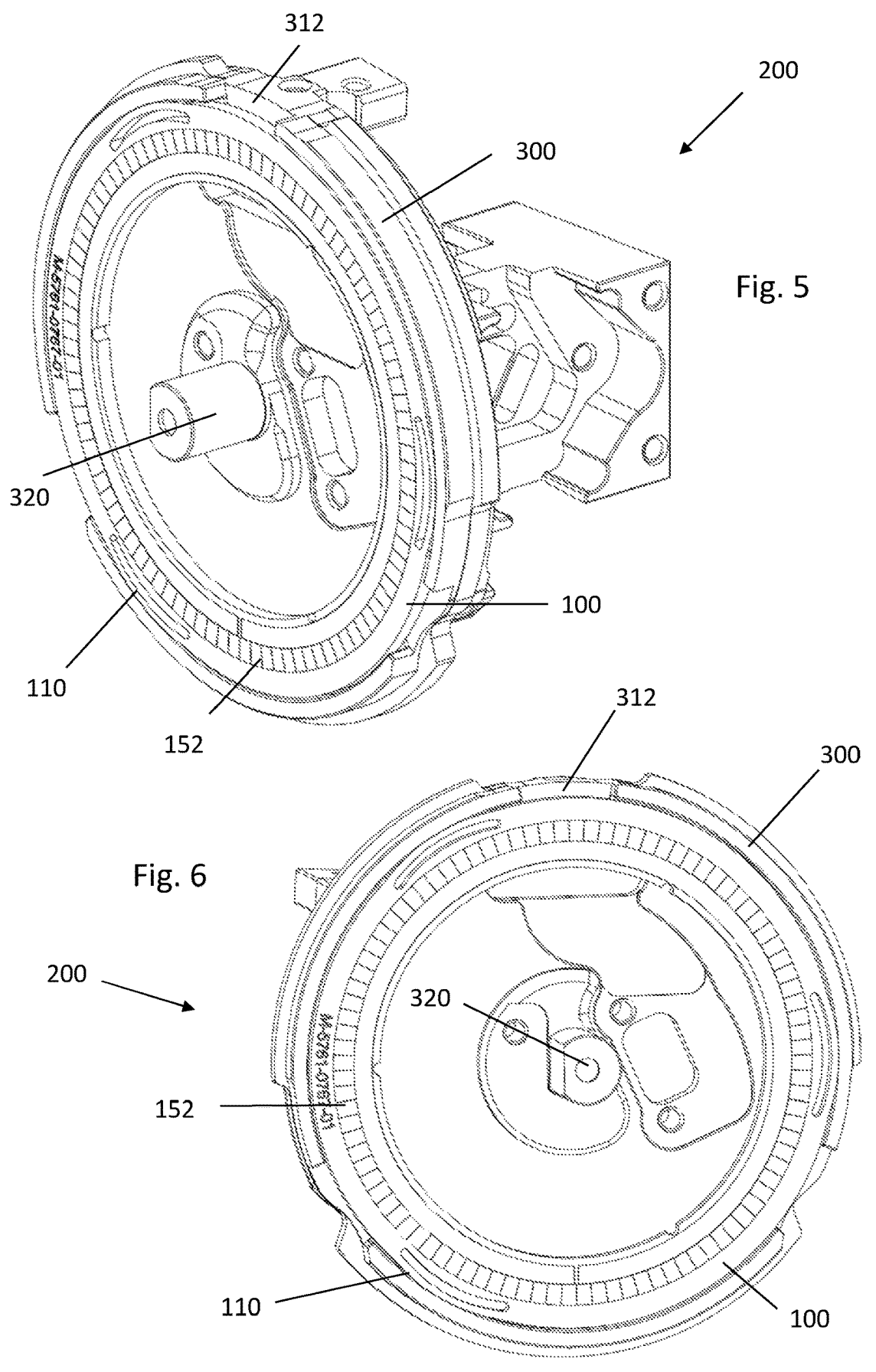

Alternative views of the embodiment of FIG. 3 can be seen in FIGS. 5 and 6.

FIG. 7 and FIG. 8 illustrate a method of mounting an encoder scale disc 100 to a mount 300 via a surround 310.

FIG. 7 shows the encoder scale disc 100 is a first position with respect to the mount 300. In the first position the radially resilient features 110 are lined up with the mount gaps 312 of the mount 300. In the first position, the radially resilient features 110 do not interact with the surround 310 to cause a radially inward force to be applied to the radially resilient features 110, in this embodiment this is because there is clearance between the radially resilient features 110 and the surround 310 which is provided for by gaps 312 in the surround 310. In the first position the encoder scale disc 100 is free to move in a direction perpendicular to the plane of the radially scale disc 100. This allows the encoder scale disc 100 to be inserted and/or removed from the mount 300.

FIG. 8 shows the encoder scale disc in a second position with respect to the mount 300. In the second position the radially resilient features 110 of the encoder disc scale 100 interact with the surround 310 to cause a radially inward force to be applied to the radially resilient features 110. In the illustrated embodiment the radially resilient features 110 interact with the surround 310 because the radially resilient features deviate radially outward from the generally circular shape of the encoder scale disc 100. The radially inward force causes the flexures 114 of the illustrated embodiment to deform inward. The radially inward force allows the encoder scale disc to be retained in the mount. The result of this is that the encoder scale disc 100 experiences a compressive load.

In order to move the encoder scale disc 100 from the first position illustrated in FIG. 7 to the second (retained) position shown in FIG. 8 the encoder scale disc 100 is rotated (in the plane of the disc). As the encoder scale disc 100 moves from the first position shown in FIG. 7 to the second position shown in FIG. 8, the radially resilient features 110 begin to interact with the surround 310 of the mount 300. In the illustrated embodiment, the surround 310 and the encoder scale disc are shaped such that a radially inward force applied to the radially resilient features 110 by the surround 310 increases as the encoder scale disc 100 is rotated further. In the illustrated embodiment, the second position shown in FIG. 8 represents a stop position where the resistance required to be overcome to further rotate the encoder scale disc 100 increases sharply and so it is possible to insert the encoder scale disc 100 into the mount 300 and rotate the encoder scale disc 100 to the same position repeatably. This means that the position of the encoder scale disc 100 (and hence the scale 152) relative to the mount of the encoder can be known without the need to be specifically measured. In the illustrated embodiment the encoder scale disc can be rotated using the assembly features 130.

FIG. 9 shows a flow chart detailing an encoder 200 assembly method 400. In a first step 402 shown in FIG. 9 an encoder scale disc 100 is inserted into a mount to be in a first position. In the above described embodiment this corresponds to the situation shown in FIG. 7 where the three radially resilient features 110 are aligned with the mount gaps 312. In the first position the encoder scale disc 100 can be inserted perpendicularly to the plane of the encoder scale disc 100 into the mount without meeting substantial resistance while the radially resilient features 110 are aligned with the mount gaps. This allows for easy insertion (or removal) of the encoder scale disc 100 from the mount 300. In order to avoid damaging the scale 152 or contaminating the encoder scale disc 100 it may be desirable to use a tool to move the encoder scale disc 100 from the first position. In step 404 a tool is engaged with the encoder scale disc 100. At step 406 the encoder scale disc 100 is rotated to a second position, this may be caused by rotating the tool. At step 408 the tool is removed.

In one embodiment, the location of the scale 152 relative to the radially resilient features 110 can be controlled by using a scale marking device (such as a laser ablator) which has a mount for an encoder scale disc 100 which is identical to the encoder mount 300. The geometric similarities between the mount 300 of the encoder 200 and the mount of the scale marking device can allow the encoder scale disc 100 to inserted into the mount of the scale marking device and positioned in the same repeatable fashion as is described above in relation to the mount 300 of the encoder shown in FIGS. 7 and 8.

FIG. 10 shows a method 500 of manufacturing the encoder scale disc 100. In a first step 502 the encoder scale disc 100 is inserted into a first position in a scale marking device (which in one embodiment is a laser ablator) without a scale being present on the encoder scale disc 100. The encoder scale disc 100 can be inserted perpendicularly to the plane of the encoder scale disc 100 into the scale marking device without meeting substantial resistance while the radially resilient features 110 are aligned with the mount gaps present in the scale marking device.

This allows for easy insertion (or removal) of the encoder scale disc 100 from the scale marking device. It may be desirable to use a tool to move the encoder scale disc 100 from the first position. This may help protect the surface of the encoder scale disc 100 from contamination which may interfere with the scale marking process. In step 504 a tool is engaged with the encoder scale disc 100. At step 506 the encoder scale disc 100 is rotated to a second position, this may be caused by rotating the tool. It may be necessary to remove the tool during the scale marking process. At step 508 the scale marking device marks the scale on the encoder scale disc. At step 510 the encoder scale disc is rotated from the second position to the first position. This may involve reengaging the tool. At step 512 the encoder scale disc 100 is removed from the scale marking device.

FIG. 11 shows a second embodiment of an encoder scale disc 1000. It will be understood that the encoder scale disc 1000 may have features similar to those of the first embodiment which are not shown in FIG. 11. In particular, the encoder scale disc 100 may comprise a scale (similar to scale 152), and may comprise a reference mark (similar to reference mark 150). The encoder scale disc 1000 may comprise assembly features (similar to assembly features 130). Optionally the encoder scale disc 1000 comprises an identification marking (similar to identification marking shown in other embodiments).

The embodiment of FIG. 11 shows a substantially planar disc, which in this embodiment is in the form of an annular ring comprising a peripheral edge 1120. In this embodiment, the encoder scale disc comprises three mounting features 1100 which are used to maintain the encoder scale disc 1000 in a mount 3000. The mount 3000 may be, for example, the mount of an encoder or alternatively, the mount of a device for applying scale. As can the seen the mount 3000 comprises three mounting spaces 3010 which correspond to the three mounting features 1100 of the encoder scale disc.

Each mounting feature 1100 comprises a first part 1200 and a second part 1220. In the current embodiment the first part 1200 and the second part 1220 have different widths. This allows the second part 1220 to be more easily deflected in a direction tangential to the peripheral outer edge 1120 of the encoder scale disc 1000. FIG. 11 shows the mounting features 1100 located within the mounting spaces 3010 of the mount 3000. However, when not located within the mounting spaces 3010 the first part 1200 and the second part 1220 of the mounting features 1100 do not extend from the encoder scale disc in a parallel manner. In the current embodiment, when not mounted in the mount, the first part 1200 extends substantially radially from the centre of the encoder scale disc 1000, while the second part 1220 extends away from the first part 1200 such that a gap 1230 between the first part 1200 and the second part 1220 becomes larger at a larger radial distance from the centre of the annular disc. This means that the mounting features 1100 must be forced towards each other in order to fit within the spaces 3010 of the mount 3000.

When mounted in the mount 3000, the mounting features 1100 exert a force tangential to the peripheral edge 1120 of the encoder scale disc (i.e. in the direction of arrows A and B) against the mount. The tangential force can be used to retain the encoder scale disc 1000 in the mount 3000.

A third embodiment is shown in FIG. 12. FIG. 12 shows part of an encoder scale disc 2000 mounted within a mount 4000 where a mounting feature 2100 is shown located within a space 4010 of a mount 4000. In this embodiment the mounting feature 2100 has a first part 2200 and a second part 2230 arranged such that when located within a space 4010 of mount 4000 the first part 2200 exerts a force substantially tangential to an outer peripheral edge of the encoder scale disc 2000 on the mount 4000 (i.e. in the direction of arrow C) and the second part 2230 exerts a force in on the mount 4000 having both tangential and radial components relative to a peripheral edge of the encoder scale disc (in this embodiment the force exerted by second part 2230 on the mount 4000 is in the direction of arrow D).

In a fourth embodiment not illustrated mounting features of an encoder scale disc may comprise first and second parts where when mounted in a mount each of the first and second parts exert a force on the mount having both radial and tangential components relative to a peripheral edge of the encoder scale disc.

FIG. 13 shows an articulated head 5000 of a measuring device which comprises an encoder and/or encoder scale disc according to one of the above described embodiments. The illustrated embodiment shows the articulated head forming part of a touch probe mounted on a coordinate measurement machine (CMM). In this embodiment the articulated head can be rotated about a first axis A1 and a second axis A2. An encoder or encoder scale disc of the embodiments described above may be used to measure movement of parts of the articulated head about first axis A1 and/or second axis A2.

In other embodiments the encoder scale 152 need not be an optical scale but could be an inductive scale, or a capacitive scale or a magnetic scale. In some embodiments the scale 152 is an absolute scale. In other embodiments the scale 152 may have both incremental and absolute features (as separate scale tracks or with absolute position information embedded within an incremental scale).

In some embodiments the number of radially resilient features may be different to the embodiment described above. In some embodiments there may be one, two, four, five, or more radially resilient features. In some embodiments the radially resilient features may deviate radially inward from the peripheral edge of the encoder scale disc, in such embodiments the mount of the encoder and/or the laser marking device may have features (such as protrusions extending radially inward) which interact with the radially resilient features of the encoder scale disc to apply a radially inward force to the radially resilient features (and so apply a compressive load to the encoder scale disc).

In some embodiments, in addition to the compressive load applied to the encoder scale disc, adhesive may be used to secure the encoder scale disc to the mount.

While in the embodiments described above, the mount 310 and the scale marking device are described as having identical features, in other embodiments this may not be the case. In some embodiments, the features of the mount and the scale marking device may be similar, for example in some embodiments the geometric characteristics of the surround (in particular the surround and mount gaps) of the mount may be similar or identical to geometric characteristics of the scale marking device.

The invention claimed is:

1. An apparatus comprising an encoder scale disc and a mount, the encoder scale disc comprising radially and/or tangentially resilient features located radially outwards of a scale configured to interact with the mount so as to locate the scale disc on the mount.

2. The apparatus according to claim 1 wherein the encoder scale disc comprises radially resilient features.

3. The apparatus according to claim 2 wherein the radially resilient features comprise flexures.

4. The apparatus according to claim 2 wherein the encoder scale disc the features deviate radially from the disc.

5. The apparatus according to claim 4 wherein the features deviate radially outwards from the disc.

6. An apparatus comprising an encoder scale disc, and a mount wherein when mounted on the mount features of a peripheral surface of the encoder scale disc interact with the mount to place the encoder scale disc in radial compression so as to retain the encoder scale disc on the mount.

7. The apparatus according to claim 1 wherein when mounted on the mount the features of the peripheral surface of the encoder scale disc deform part of the mount.

8. The apparatus according to claim 1 wherein when mounted on the mount the features of the peripheral surface of the encoder scale disc are deformed by part of the mount.

9. The apparatus according to claim 7 wherein the deformation comprises elastic deformation.

10. An apparatus comprising an encoder scale disc, and a mount wherein when mounted on the mount the encoder scale disc is placed in radial compression.

11. The encoder scale disc of claim 1.

12. A measurement apparatus comprising the apparatus comprising an encoder scale disc and a mount, the encoder scale disc comprising radially and/or tangentially resilient features located radially outwards of a scale configured to interact with the mount so as to locate the scale disc on the mount, and/or the encoder scale disc of claim 11.

13. A method of manufacturing an apparatus comprising an encoder scale disc, comprising in any suitable order mounting a disc comprising radially resilient features to a device for applying scale, wherein the radially resilient features of the disc interact with the device for applying scale to place the disc in radial compression, applying a scale to the disc, removing the disc from the device for applying scale, mounting the disc on an apparatus, wherein mounting features on the device for applying scale and the apparatus interact in the same manner to place the disc in radial compression.

14. The method according to claim 13 comprising applying scale to the disc at a location radially inward of the radially resilient features.

15. The method of manufacturing an apparatus according to claim 13 wherein when mounted on a mount of the device for applying scale or on a mount of the apparatus the radially resilient features of the disc deform part of the or each mount.

16. The method of manufacturing an apparatus according to claim 13 wherein when mounted on a mount of the device for applying scale or on a mount of the apparatus the radially resilient features of the disc are deformed by part of the or each mount.

17. The method of manufacturing an apparatus according to claim 13 wherein the device for applying scale and the apparatus comprise geometrically common features for interacting with the radially resilient features of the disc.

18. The method of manufacturing an apparatus according to claim 13 wherein the disc is moved relative to the mount of the device for applying scale or the mount of the apparatus between a first position and a second position and wherein in the second position interaction between the mount and the radially resilient features applies a radially inward force to the disc.

19. The method of manufacturing an apparatus according to claim 18 wherein the radially inward force applied to the disc in the second position is greater than a radially inward force to the disc by the mount of the device for applying scale or the mount of the apparatus in the first position.

20. The method of manufacturing an apparatus according to claim 18 wherein in the first position there is clearance between the mount of the device for applying scale or the mount of the apparatus and the radially resilient features.

21. The method of manufacturing an according to claim 18 wherein the encoder disc is rotated relative to the mount of the device for applying scale or the mount of the apparatus between the first position and the second position.

* * * * *